US012573639B2

(12) United States Patent
Han et al.

(10) Patent No.: US 12,573,639 B2
(45) Date of Patent: Mar. 10, 2026

(54) LARGE-AREA COPPER NANOFOAM WITH HIERARCHICAL STRUCTURE FOR USE AS ELECTRODE

(71) Applicant: CellMo Materials Innovation, Inc., Berkeley, CA (US)

(72) Inventors: Gigap Han, Chungcheongnam-do (KR); Hyeji Park, Seoul (KR); Kicheol Hong, Busan (KR); Heeman Choe, Walnut Creek, CA (US)

(73) Assignee: CellMo Materials Innovation, Inc., Berkeley, CA (US)

( * ) Notice: Subject to any disclaimer, the term of this patent is extended or adjusted under 35 U.S.C. 154(b) by 1046 days.

(21) Appl. No.: 17/413,513

(22) PCT Filed: Dec. 18, 2019

(86) PCT No.: PCT/US2019/067295
§ 371 (c)(1),
(2) Date: Jun. 11, 2021

(87) PCT Pub. No.: WO2020/132149
PCT Pub. Date: Jun. 25, 2020

(65) Prior Publication Data
US 2022/0052350 A1     Feb. 17, 2022

Related U.S. Application Data

(60) Provisional application No. 62/781,579, filed on Dec. 18, 2018.

(51) Int. Cl.
*H01M 4/80* (2006.01)
*B22F 3/11* (2006.01)
(Continued)

(52) U.S. Cl.
CPC ............... *H01M 4/808* (2013.01); *C22C 1/08* (2013.01); *C22C 3/00* (2013.01); *C22C 9/01* (2013.01);
(Continued)

(58) Field of Classification Search
CPC ............. H01M 4/808; C23C 10/34–58; C22C 1/08–088; C23F 1/00
(Continued)

(56) References Cited

U.S. PATENT DOCUMENTS

| | | | | |
|---|---|---|---|---|
| 3,185,566 A | * | 5/1965 | Galmiche | ............... C23C 10/42 419/57 |
| 3,787,205 A | * | 1/1974 | Church | ..................... B22F 3/17 419/48 |

(Continued)

FOREIGN PATENT DOCUMENTS

| | | |
|---|---|---|
| CN | 106868536 | 12/2015 |
| CN | 105648260 | 6/2016 |

(Continued)

OTHER PUBLICATIONS

Liu, Wenbo, Shichao Zhang, et al. "Preparation and characterization of novel sandwich-typed three-dimensional bimodal nanoporous copper-supported tin thin-film anode for lithium ion battery." International Journal of Electrochemical Science, vol. 8, No. 3, Jan. 1, 2013, pp. 3928-3938 (Year: 2013).*

(Continued)

*Primary Examiner* — Robert S Carrico
(74) *Attorney, Agent, or Firm* — Aka Chan LLP

(57) ABSTRACT

A facile method is based on a pack-cementation process using large-area copper foil instead of copper powder. By controlling a pack-cementation time and an amount of alloying element (e.g., aluminum), a hierarchical microporous or nanoporous copper can be created. When coated with (Continued)

A) MIXING FOR 30 MIN     B) PACKING AND SEALING     C) PACK-CEMENTATION

Cu SUBSTRATE
POWDER MIXTURE
STAINLESS STEEL RETORT

Al DEPOSITION
Cu SUBSTRATE

NANOPOROUS Cu FOAM     3) DEALLOYING     D) HOMOGENIZATION

HCl SOLUTION
H₂
Cu-Al ALLOY
Cu-Al ALLOY tin active material, the hierarchical microporous or nanoporous copper can be used as an advanced lithium-ion battery anode. A coin-cell test exhibited a four-fold higher areal capacity (e.g., 7.4 milliamp-hours per square centimeter without any performance degradation up to 20 cycles) as compared to a traditional graphite anode.

28 Claims, 12 Drawing Sheets

(51) Int. Cl.

| | |
|---|---|
| *C22C 1/08* | (2006.01) |
| *C22C 3/00* | (2006.01) |
| *C22C 9/01* | (2006.01) |
| *C22C 21/12* | (2006.01) |
| *C23C 10/36* | (2006.01) |
| *C23C 10/38* | (2006.01) |
| *C23C 10/44* | (2006.01) |
| *C23C 10/48* | (2006.01) |
| *H01M 4/134* | (2010.01) |
| *H01M 4/38* | (2006.01) |
| *H01M 4/66* | (2006.01) |
| *H01M 10/0525* | (2010.01) |

(52) U.S. Cl.
CPC .............. *C22C 21/12* (2013.01); *C23C 10/36* (2013.01); *C23C 10/38* (2013.01); *C23C 10/44* (2013.01); *C23C 10/48* (2013.01); *H01M 4/134* (2013.01); *H01M 4/387* (2013.01); *H01M 4/661* (2013.01); *H01M 10/0525* (2013.01); *B22F 3/1103* (2013.01); *B22F 2998/10* (2013.01)

(58) Field of Classification Search
USPC .................................................. 427/252–253
See application file for complete search history.

(56) References Cited

U.S. PATENT DOCUMENTS

| | | | | |
|---|---|---|---|---|
| 2015/0072236 A1* | 3/2015 | Um | ...................... | H01M 4/1395 |
| | | | | 429/231.95 |
| 2017/0263938 A1* | 9/2017 | Harutyunyan | .......... | H01M 4/80 |
| 2019/0010627 A1* | 1/2019 | Zhan | ........................ | C25F 3/02 |
| 2019/0040497 A1* | 2/2019 | Yushin | .................... | C22C 3/005 |

FOREIGN PATENT DOCUMENTS

| | | | | |
|---|---|---|---|---|
| JP | S55-73346 A | 6/1980 | | |
| JP | 2010-009856 A | 1/2010 | | |
| JP | WO2013145752 A1 * | 10/2013 | ............. | H01M 4/13 |
| JP | 2017-162812 A | 9/2017 | | |

OTHER PUBLICATIONS

Liu, Wenbo, et al. "Dealloying solution dependence of fabrication, microstructure and porosity of hierarchical structured nanoporous copper ribbons." Corrosion Science, vol. 94, Feb. 2, 2015, pp. 114-121 (Year: 2015).*
Han, Gigap et al. "Hierarchically structured nanoporous copper for use as lithium-ion battery anode," Scripta Materialia, vol. 163, 2019, pp. 9-13. (Year: 2019).*
Sarrazin, Pierre et al. "6.3.1.1 Pack Cementation" in: Mechanisms of High Temperature Corrosion—A Kinetic Approach (New York, Trans Tech Publications, 2008), pp. 233-238. (Year: 2008).*
Zhang, Shichao et al., A three-dimensional tin-coated nanoporous copper for lithium-ion battery anodes, Dec. 21, 2010, pp. 6915-6919, Journal of Power Sources, vol. 196, Issue 16, Aug. 15, 2011.
Liu, Wenbo et al., Chemically monodispersed tin nanoparticles on monolithic 3D nanoporous copper for lithium ion battery anodes with ultralong cycle life and stable lithium storage, Feb. 15, 2019, 33 pages, Nanoscale, 2019.
International Search Report, PCT Application PCT/US2019/067295, May 7, 2020, 3 pages.

* cited by examiner

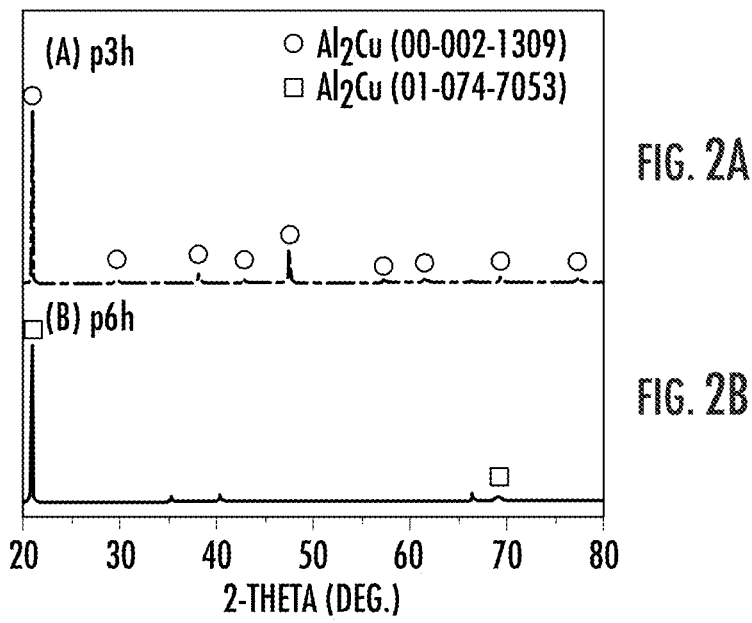
FIG. 2A
FIG. 2B
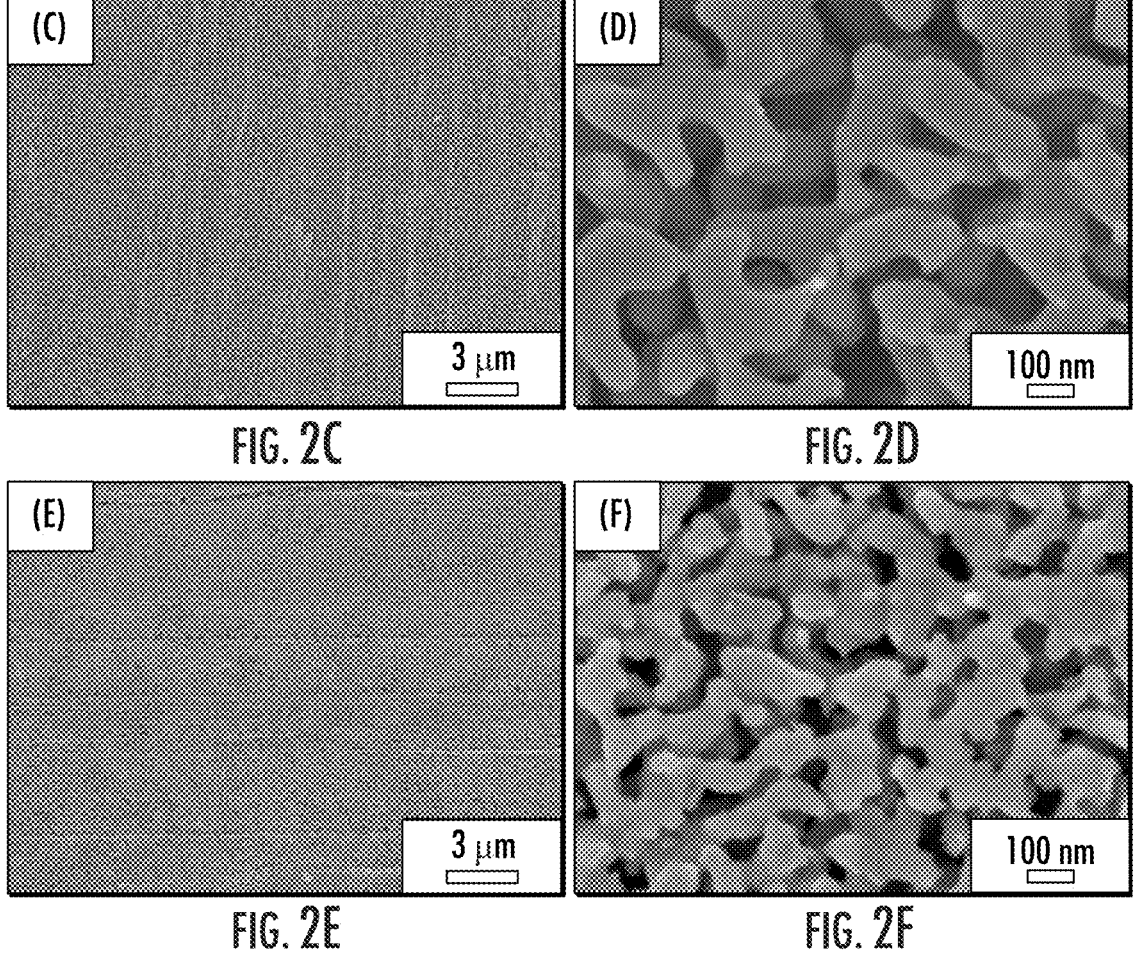
FIG. 2C
FIG. 2D
FIG. 2E
FIG. 2F

16. HIERARCHICAL MICRO-LAMELLA POROUS COPPER@Sn
26. THICK MESOPOROUS $Co_3O_4$ NANOSHEET
27. Si NANOWIRE ARRAYS ON Cu FOAM
28. HOLLOWED $SnO_2@TiO_2$ CORE-SHELL NANOWIRE
29. TIN NANOPARTICLES EMBEDDED IN CARBON NANOTUBES ON CARBON CLOTH
30. 3D CARBON/ZnO NANOMEMBRANE FOAM
31. $SnO_2@\alpha$-Si CORE-SHELL NANOWIRES ON FREE STANDING CNT PAPER
32. 3D COPPER FOAM@$FeO_x$ NANOARRAYS
33. HIERARCHICAL NANO-BRANCHED c-Si/$SnO_2$ NANOWIRES

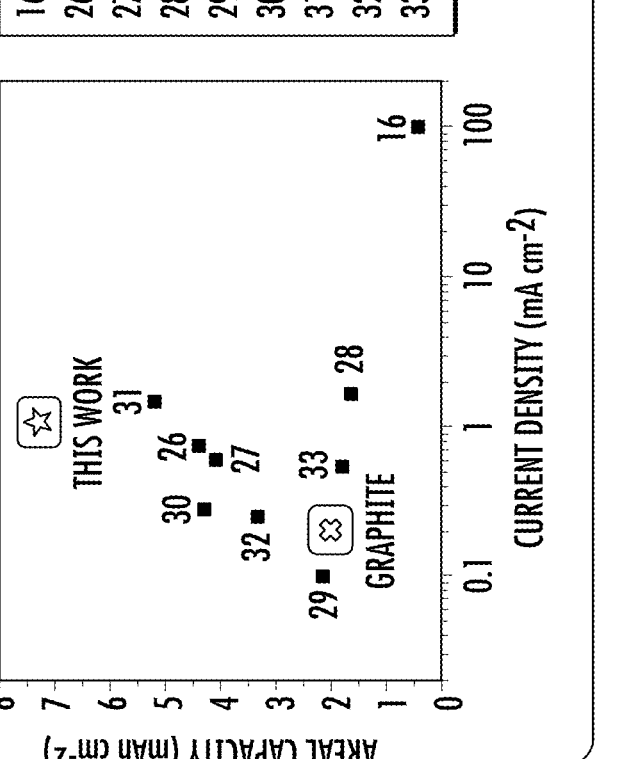

SnO (01-085-0712)

Cu3Sn (03-055-4653)

Cu (00-710-1254)

Cu2O (00-900-5769)

2-THETA (DEG.)

LARGE-AREA COPPER NANOFOAM WITH HIERARCHICAL STRUCTURE FOR USE AS ELECTRODE

CROSS-REFERENCE TO RELATED APPLICATIONS

This patent application claims the benefit of U.S. patent application 62/781,579, filed Dec. 18, 2018, which is incorporated by reference along with all other references cited in this application.

BACKGROUND OF THE INVENTION

This invention relates to the field of metal electrodes, and more specifically to techniques of manufacturing a large-area copper nanofoam with hierarchical structure for use as advanced electrode in energy devices including batteries and energy storage cells.

Techniques for the manufacture of dealloyed nanoporous copper have not been realized for practical applications. This is because of any results have small size and poor mechanical properties caused by the use of metal "powders" to create a precursor alloy prior to dealloying.

Therefore, there is a need for improved electrode material with carefully designed structure for lithium-ion battery to enhance their capacity and power performance for use in modern mobile and electronic devices.

BRIEF SUMMARY OF THE INVENTION

A facile synthesis is based on a pack-cementation process using copper foil instead of copper powder. Depending on the pack-cementation time and the amount of aluminum, a hierarchical microporous or nanoporous copper is created and can be coated with tin for use as lithium-ion battery anode. The coin-cell test of the nanocopper foam anode exhibited a four-fold higher areal capacity (7.4 milliamp-hours per square centimeter without any performance degradation up to 20 cycles) than traditional graphite anode owing to its considerably higher surface area.

A technique utilizes pack cementation process for the manufacture of precursor alloy in the form of foil and dealloying process for forming nanoscale copper struts and pores throughout the specimen, results in hierarchical microporous or nanoporous or full nanoporous copper (NPC). Additionally, this method can be used to manufacture large-area nanocopper foam on the basis of a new foil-based process with high reproducibility and decent mechanical properties. This method is a much simpler manufacturing process compared to any conventional methods.

As a representative example, the aluminum-copper alloy precursor foil was selected and processed with a aluminum concentration which can vary from about 20 atomic percent to about 85 atomic percent. The aluminum concentration can represent a porosity when it is subsequently etched away. The alloy precursor can be reacted in a dealloying solution (HCl). The ligament size can be modified from about 50 nanometers to about 500 nanometers and the pore size can be controlled from about 10 nanometers to about 10 microns due to different corrosion behavior for different the aluminum-copper phases.

The pack cementation temperature can be varied from about 400 degrees Celsius to about 900 degrees Celsius in order to form the aluminum-copper precursor alloy foil. The dealloying solution can be about a 0.01 molar to about 20 molar hydrochloric acid (HCl) solution at about 20 degrees Celsius to about 100 degrees Celsius. The pack cementation can contain the mixed powder pack of one or more metal powders, filler, and halide salt activator.

The dealloying process can be carried out on the fabricated precursor alloy based on the chemical corrosion potential difference in reference to the standard hydrogen electrode. Therefore, aluminum can be replaced with another element that possesses greater corrosiveness than copper. For example, the other element can be magnesium (Mg), silicon (Si), chromium (Cr), niobium (Nb), zinc (Zn), titanium (Ti), molybdenum (Mo), tin (Sn), or manganese (Mn), or any combination. The halide salt can be sodium chloride (NaCl), sodium fluoride (NaF), or ammonium chloride (NH4Cl), or a combination.

The pack cementation temperature can be set below the melting temperature of metal precursor. The dealloying solution can be one of the following solutions: hydrogen chloride (HCl), sodium hydroxide (NaOH), nitric acid $(HNO_3)$, phosphoric acid $(H_3PO_4)$, or perchloric acid $(HClO_4)$, or a combination.

The manufactured hierarchical microporous or nanoporous or full nanoporous copper (NPC) can be used for various energy devices due to its large surface area and unique three-dimensional structure. As an example, it has been used as lithium-ion battery anode current collector after coated with tin active material, which reacts with and stores lithium ions and well accommodates the volume expansion during charging and discharging cycling processes.

An additional anode active material can be filled in the nanocopper foam anode such as graphite-based material, metal-based material, or oxide-based material. It can also be selected from one of the following: artificial graphite, natural graphite, soft carbon, hard carbon, tin-lithium based alloys, silicon-lithium based alloys, indium-lithium based alloys, antimony-lithium based alloys, germanium-lithium based alloys, bismuth-lithium based alloys, gallium-lithium based alloys, and oxide based materials comprising at least one of tin dioxide (SnO2), cobalt oxide (Co3O4), copper oxide (CuO), nickel oxide (NiO), or iron oxide (Fe3O4), or a combination.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 2A-2F show x-ray diffraction patterns of the p3h and p6h samples after dealloying and their corresponding SEM images on the surface of nanoporous copper foam sample.

FIGS. 4A-4B show cycle performance of the $SnO/Cu_3Sn/Cu_2O/Cu$ lithium-ion battery anode at about 1 milliamp per square centimeter in about 0.01-3.0 volts and comparison of the areal capacity of the $SnO/Cu_3Sn/Cu_2O/Cu$ anode with those of similar nanoscale anode materials.

DETAILED DESCRIPTION OF THE INVENTION

Figure 1:
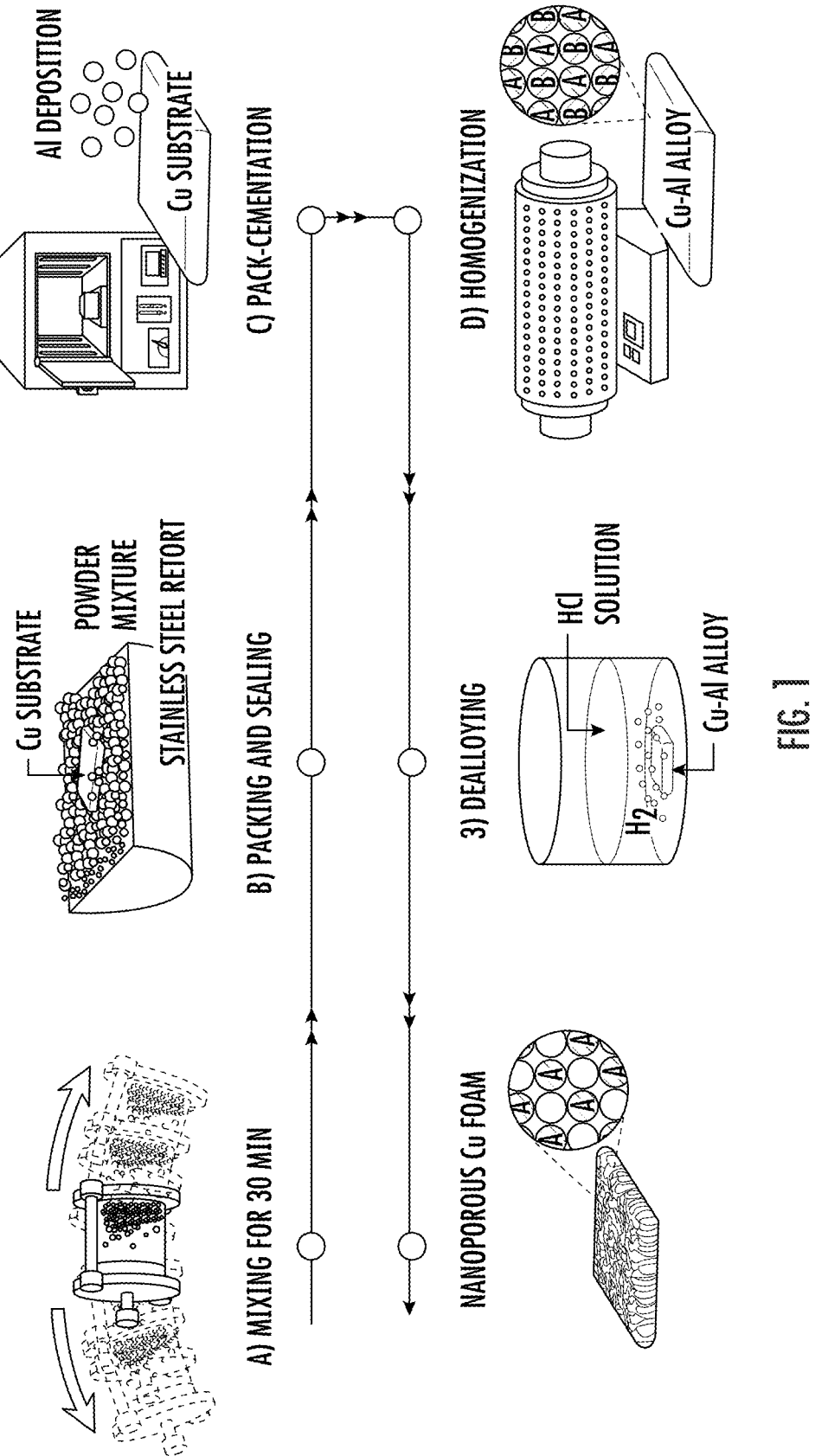
FIG. 1 shows a schematic of the proposed novel synthesis method to create nanoporous or microporous or nanoporous copper using a pack-cementation aluminum coating process on copper foil to create large-area nanocopper foam. More specifically, the area of the final nanocopper foam product can be enlarged relatively easily, depending on the size of the initial copper foil used.
Figures 3A, 3B, 3C, 3D, 3E, 3F:
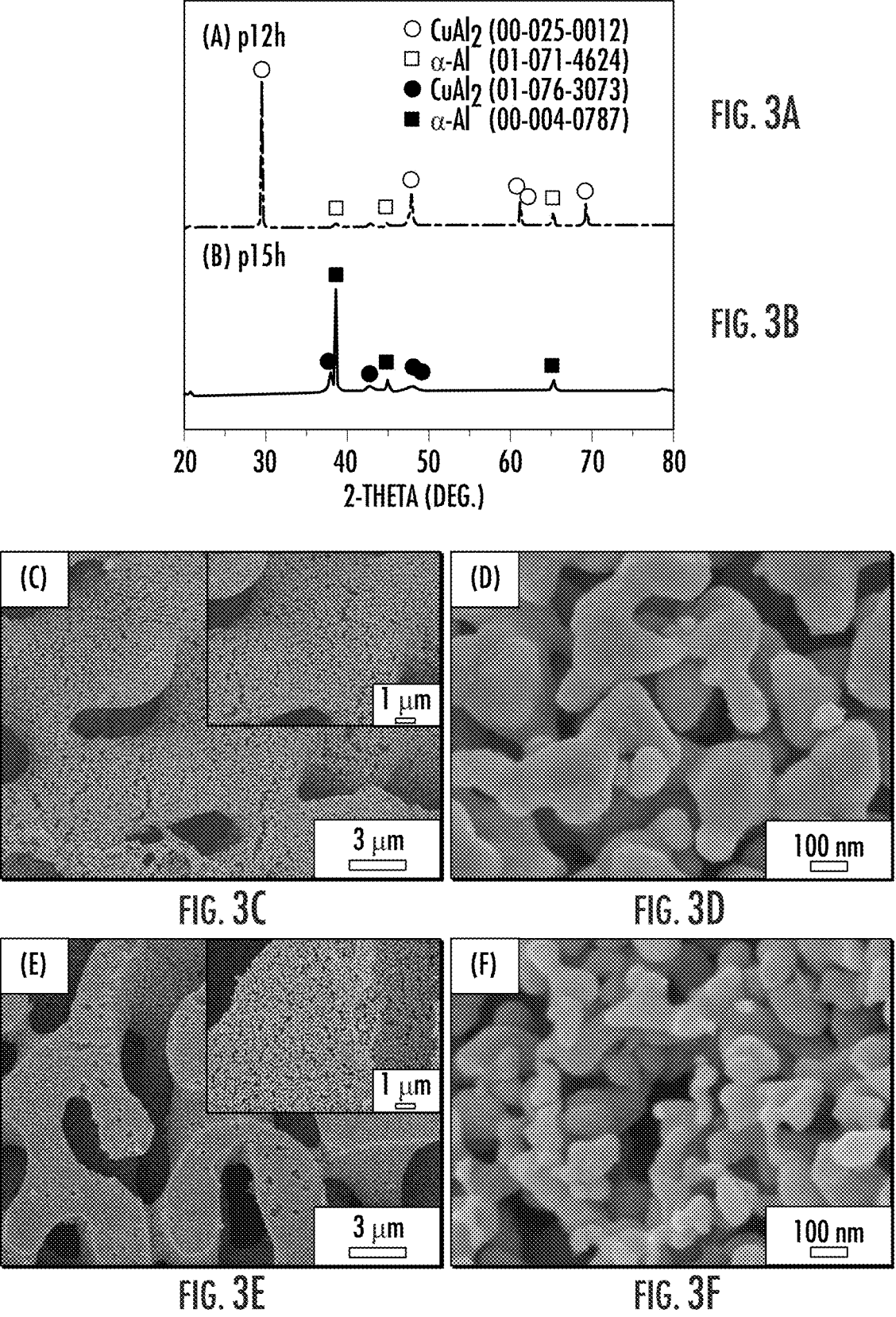
FIGS. 3A-3F show x-ray diffraction patterns of the p12h and p15h samples after dealloying and their corresponding SEM images on the surface of the nanoporous copper foam with hierarchical structure.

Nanoporous metallic structures can provide beneficial properties such as outstanding specific surface area, low density, and efficient catalytic reactions due to their unique three-dimensional structure. Therefore, nanoporous metallic structures have potential for use in energy device applications such as electrocatalysts, actuators, and energy storage (e.g., batteries and secondary batteries). Various syntheses of nanoporous metals may be created using different methods such as chemical dealloying, metallic melt dealloying, and oxygen plasma dealloying. The chemical dealloying method is the most commonly used method for manufacturing nanoporous metals, which are generally composed of pores with a mean diameter of less than 100 nanometers. In this case, chemical dealloying selectively dissolves one or more element (the less noble metal) from an alloy using various acid or base solutions.

Recently, nanoporous copper (NPC) with interconnected nanosized pore structures have been discussed. A few processing methods have been developed to prepare an alloy precursor prior to dealloying such as powder-metallurgy, electrolytic plating, and ingot casting methods. All of these precursor methods have drawbacks to be overcome for use in practical applications due to their complexity and limitation in producing large-sized samples. In particular, the common powder-metallurgy method requires high pressure and temperature to completely consolidate two or more different powders. Consequently, the nanoporous copper produced using this method generally exhibits micro-sized defects, which eventually lead to cracks during the dealloying process (or in the final nanoporous copper).

To improve the mechanical properties and enhance the area of the final nanoporous copper sample, a new facile dealloying technique is described in combination with a pack-cementation aluminum coating process for a copper foil. In other words, a uniform thin layer of aluminum is coated onto the prepared copper foil, using a pack-cementation method to create a copper-aluminum alloy precursor with a subsequent heat-treatment process; according to the technique, large-area nanocopper foam sample can be produced by preparing large initial copper foil. Depending on the desired final porosity and pore structure, the thickness of aluminum coating layer can be controlled precisely by controlling the pack cementation time and temperature.

By slight manipulation of the phases present in the aluminum-copper alloy precursor, it was possible to create a hierarchically structured microporous or nanoporous copper along with the traditional nanoporous copper. More specifically, the unique hierarchical microporous or nanoporous copper was created by optimizing the composition and heat-treatment process. This was based on the phase diagram between aluminum and copper such that a dual phase can be formed consisting of a solid-solution $\alpha$-Al and intermetallic $Al_2Cu$. In this case, the solid-solution phase of $\alpha$-Al can be preferentially etched away in an acid solution to create micropores between the intermetallic $Al_2Cu$ cellular phase, which is later also etched away to create nanopores. It is expected that the hierarchical architecture with a combination of nanopores and micropores can have promising applications for use in various electrocatalysts and other energy-related areas requiring high electrochemical efficiency such as lithium-ion batteries (LIBs) (due to its large surface area).

To demonstrate the promising energy device applications of the microporous or nanoporous copper manufactured in this technique, it was used as an advanced anode of a lithium-ion battery after being coated with tin as an anode active material (through an electroless plating process), completely free of binder and conductive agent. Tin, which can form various alloys with lithium, has recently attracted significant attention as a high-capacity anode active material for advanced lithium-ion battery. This is because it has a higher theoretical capacity (e.g., 991 milliamp-hours per gram) than graphite (e.g., 372 milliamp-hours per gram). However, an important drawback remains when it is applied to traditional lithium-ion battery anode. Tin suffers from severe volumetric expansion (up to 300 percent) during insertion or extraction of lithium ions during charging or discharging processes that eventually lead to premature cycling failure on copper foil anode design.

This study has demonstrated that hierarchical microporous or nanoporous copper coated with tin could help to resolve the issues caused by use of tin during cycling. The structural characterization was investigated and the lithium-ion battery anode performance of the microporous or nanoporous structured three-dimensional (3-D or 3D) porous copper-tin anode was compared with those of the tin-based anodes with nanostructures. The microstructure examination was carried out using x-ray diffraction (XRD), scanning electron microscopy (SEM), and energy dispersive X-ray spectroscopy (EDS). In addition, the capacity and cyclic performance of the microporous or nanoporous copper anode coated with tin was analyzed.

Example 1: Nanoporous Copper Sample Preparation

Aluminum-copper alloy precursors were synthesized using a pack cementation method prior to dealloying. FIG.

1 shows the schematic of the overall processing route. The first step shows the mixing of powders used in the pack-cementation process. The powders were composed of 3 weight percent $NH_4Cl$ powder (100 micron, Alfa Aesar, USA) as an activator, 15 weight percent pure aluminum powder (99.8 percent, +325 mesh, Alfa Aesar, USA) as a coating metal source, and 82 weight percent $Al_2O_3$ powder (60 μm, Alfa Aesar, USA) as filler. Mechanical mixing (8000-D Mixer Mill, SPEX Sample Prep, USA) was carried out for 30 min to obtain uniformly mixed powders. After mixing, packing and sealing (FIG. 1b) was carried out using a stainless-steel envelope for the subsequent heat-treatment step; pack cementation (FIG. 1c) was then conducted at a constant 800 degrees Celsius for 15 minutes, 30 minutes, 3 hours, 6 hours, 12 hours, or 15 hours to form different aluminum copper alloy precursor foils for comparison in an air tube furnace. The pack-cemented aluminum copper alloy precursor foils are hereinafter referred to as p15m, p30m, p3h, p6h, p12h, and p15h. At the end of the pack cementation process, the sealed envelope was inserted into water. Subsequently, an additional heat-treatment process (FIG. 1d) was carried out for homogenization at 500 degrees Celsius for 9 hours or at 700 degrees Celsius for 6 hours in a tube furnace in an argon atmosphere. The dealloying process (FIG. 1e) of the aluminum copper alloy precursors was then carried out in a 3 weight percent HCl solution at 50 degrees Celsius to etch away aluminum atoms from the aluminum copper alloy. The final nanoporous copper was rinsed with dehydrated alcohol. The microstructures of the pack-cemented aluminum-copper alloy precursor foils and the dealloyed nanoporous copper samples were character-ized and analyzed using SEM (JSM7401F, JEOL) combined with an EDS analyzer. XRD (Rigaku Ultima III Xray diffractometer) with copper K-alpha radiation (wavelength of 1.5406 Angstroms) was also used to determine alloy phases between aluminum and copper.

Example 2: Electroless Tin Coating Process

To demonstrate the performance of the synthesized nan-oporous copper as a lithium-ion battery anode, a high-capacity anode active material (tin) was coated onto the nanoporous copper through electroless plating. Nanoporous copper was immersed in a tin plating solution at 60 degrees Celsius for 1 minute. The tin plating solution consisted of 200 milliliters deionized water containing 2 grams of tin (II) chloride dehydrate ($SnCl_2 \cdot 2H_2O$), 2 grams of sodium phos-phate monohydrate ($NaH_2PO_2 \cdot 2H_2O$), 10.5 grams of thio-urea ($CS(NH_2)_2$), and 0.84 milliliters of concentrated hydro-chloric acid. Subsequently, the tin-coated nanoporous copper anode samples were heat-treated at 150 degrees Celsius for 1 hour in a tube furnace in an argon atmosphere.

Example 3: Lithium-Ion Battery Coin-Cell Cycling Test

A copper disk was prepared with dimensions of 11 millimeters in diameter and 250 microns in thickness. A CR2032-type coin-cell was assembled in a glove box in a dry argon atmosphere using the tin-coated nanoporous cop-per anode coupon as the working electrode and a lithium metal foil for both the counter and reference electrodes. The electrolyte was a traditional 1.3 molar $LiPF_6$ solution of ethylene carbonate (EC) and diethylene carbonate (DEC) in a 3:7 volume ratio. Galvanostatic tests were carried out on the assembled coin cells containing the tin-coated nanop-orous copper anode coupon at a current density of 1 milliamps per square centimeter in the voltage range of 3.0 volts to 0.01 volts (versus Li-ion/Li) at 25 degrees Celsius.

Results of the Examples: Processing of Aluminum-Copper Precursor Based on Pack Cementation The pack cementation time was varied from 15 minutes to 15 hours to yield different aluminum-copper alloy precursor foils with compositions ranging from 9.7 atomic percent aluminum to 79.6 atomic percent aluminum. The thickness of the foil specimen increased from 255.0 plus or minus 0.5 to 1139.6 plus or minus 26.6 microns with increasing pack cementation time up to 15 hours (table S1, FIGS. 5 and 6A-6F).

Table S1 provides a list of aluminum-copper alloy pre-cursor samples with varied pack cementation time from 15 minutes to 15 hours. Based on the weight measurements before and after the pack cementation process, the relative aluminum and copper compositions were estimated as atomic percentages. The major phases present after the homogenization process were identified by x-ray diffraction.

TABLE S1

| Specimen | Al (at %) | Cu (at %) | Pack cementation time | Major phases after homogenization |
|---|---|---|---|---|
| p15m | 9.7 ± 0.2 | 93.3 ± 0.2 | 15 min | Cu, $Cu_9Al_4$ |
| p30m | 45.9 ± 1.5 | 54.2 ± 1.5 | 30 min | Cu, $Cu_9Al_4$ |
| p3h | 52.2 ± 0.6 | 47.8 ± 0.6 | 3 h | $Al_2Cu$ |
| p6h | 60.7 ± 3.1 | 39.3 ± 3.1 | 6 h | $Al_2Cu$ |
| p12h | 75.0 ± 3.3 | 25.0 ± 3.3 | 12 h | α-Al, $Al_2Cu$ |
| p15h | 79.6 ± 2.9 | 20.4 ± 2.9 | 15 h | α-Al, $Al_2Cu$ |

Three dimensionally connected nanoporous copper can be obtained through dealloying only when the composition of aluminum is sufficiently high. The p15m and p30m samples contain only the copper and $Cu_9Al_4$ phases. They cannot react with the dealloying solution through the interior of the specimen due to the low content of aluminum (FIGS. 7A-7D). The type of dealloying solution (e.g., hydrochloric acid or sodium hydroxide) also affects the corrosion behav-ior of each constituent phase present in the alloy precursor. For example, the aluminum copper phase possesses good stability in hydrochloric acid (HCl) solution, whereas alu-minum and $Al_2Cu$ phases do not. Therefore, the $Al_2Cu$ and α-Al phases become unstable and tend to produce nanop-orous copper only when using a hydrochloric acid solution.

FIGS. 2A-2F show the x-ray diffraction (XRD) patterns of the p3h and p6h samples with all the peaks corresponding to only the $Al_2Cu$ phase, which can create uniform three-dimensional nanopores upon dealloying. As a result, both the p3h (FIGS. 2C-2D) and p6h (FIGS. 2E-2F) samples were able to dissolve the entire aluminum in the hydrochlo-ric acid solution and form pure nanoporous copper ligaments throughout the whole thickness of the sample. The mean ligament size of the p3h (FIGS. 2C-2D) and p6h (FIGS. 2E-2F) samples was estimated to be 150 plus or minus 64 nanometers and 125 plus or minus 26 nanometers, respec-tively (after dealloying). The ligament size of the nanop-orous copper after dealloying decreased with increasing aluminum content due to the formation of the finer $Al_2Cu$ phase.

FIGS. 3A-3F also show x-ray diffraction patterns of p12h (FIGS. 3C-3D) and p15h (FIGS. 3E-3F) specimens contain-ing only the phases of a solid-solution α-Al and $Al_2Cu$. It is interesting to note that both the p12h and p15h samples are composed of hierarchically structured micropores or nan-opores throughout the whole specimen. The mean micropore diameter of the p12h and p15h samples is calculated to be 5.5 plus or minus 2.2 microns and 6.5 plus or minus 2.4 microns, respectively. The mean micropore diameter of the p15h sample is 18 percent larger than that of the p12h sample. This is because the amount of solid-solution $\alpha$-Al is greater in the p15h sample, which creates larger micropores between the copper struts.

Figure 8:
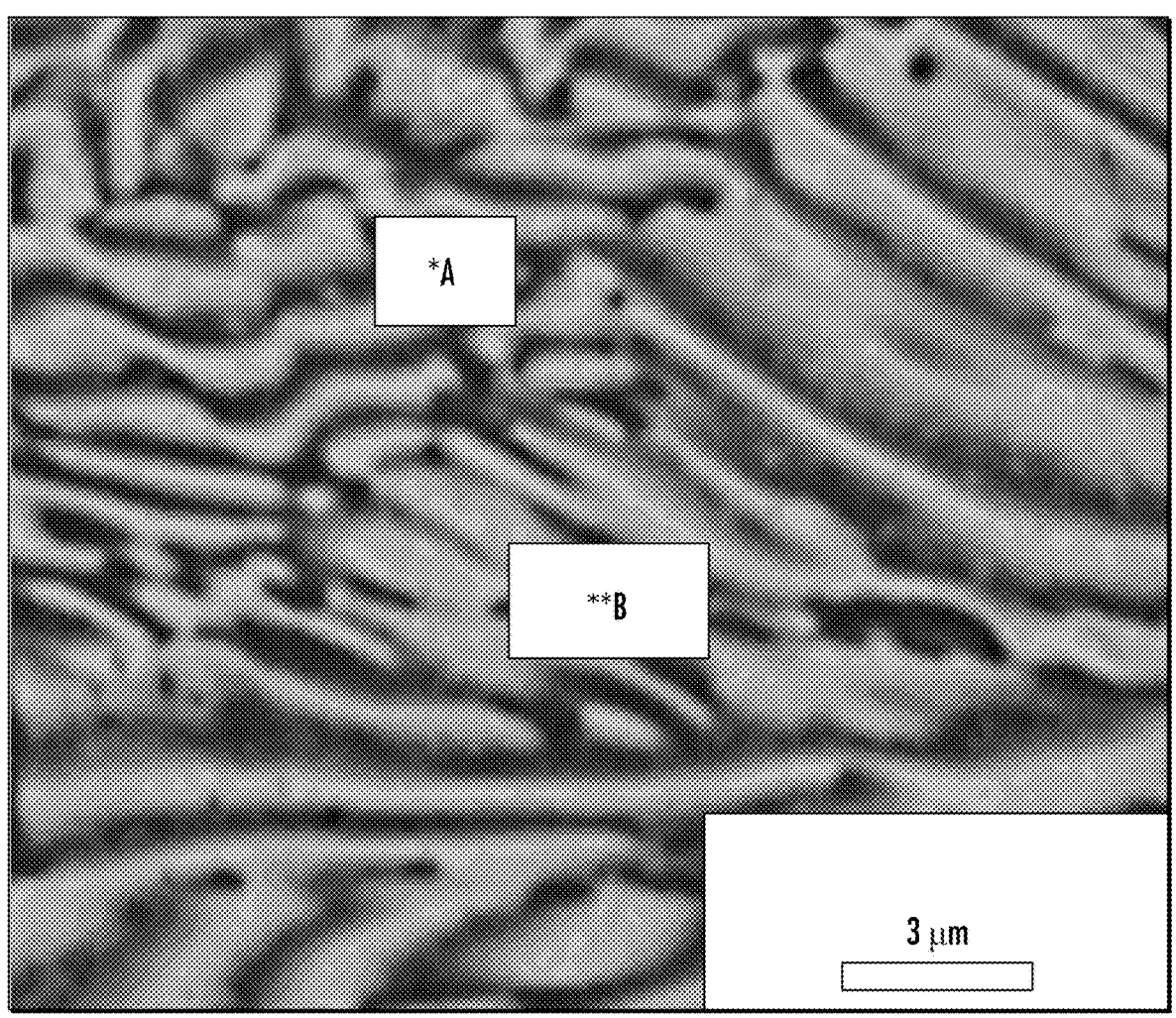
FIG. 8 shows back-scattered SEM image of the p15h sample showing a continuous network of the solid-solution $\alpha$-Al (darker area: A) and $Al_2Cu$ (brighter area: B). Upon deploying, uniform three dimensionally connected $\alpha$-Al and $Al_2Cu$ phases created micropores and nanopores, respectively.
Figure 9:
FIG. 9 shows a comparison plot of strut size distribution in the nanoporous and microporous or nanoporous copper samples using a standard metallographic method.
Figure 10:
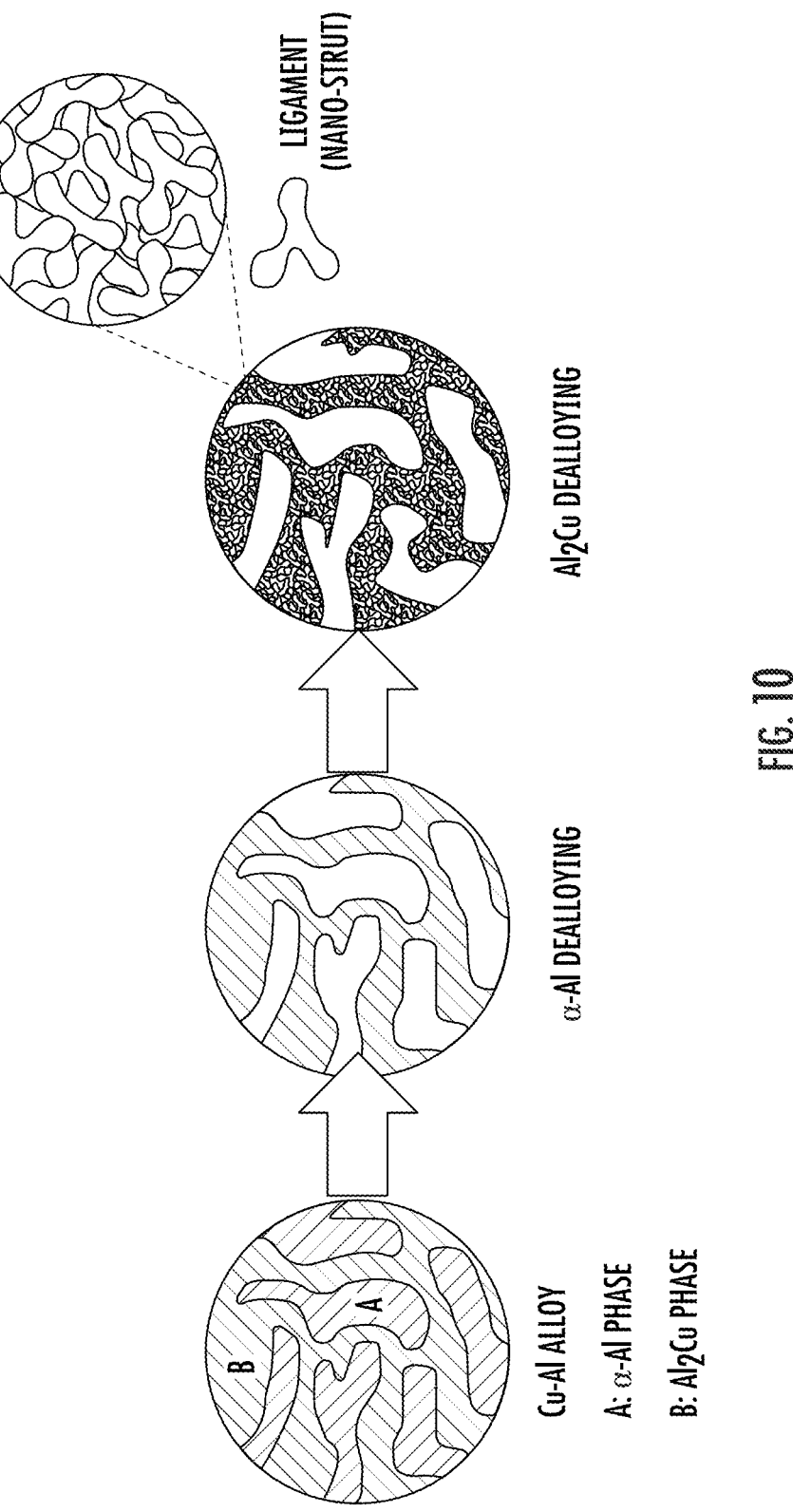
FIG. 10 shows schematic showing the dealloying mechanism of the hierarchical microporous or nanoporous copper sample manufactured according to a technique described by this patent. The solid-solution $\alpha$-Al phase creates micropores whereas the intermetallic $Al_2Cu$ phase creates nanopores upon dealloying.

Along with the micropores, each copper strut consists of nanoscale pores between randomly structured nano-sized ligaments. The mean thickness of the nano-sized ligament is estimated to be 209.8 plus or minus 100.7 nanometers and 98.7 plus or minus 46.7 nanometers for the p12h and p15h samples, respectively (FIG. 9). Furthermore, a back-scatted SEM image of the p15h sample clearly shows a uniform, continuous network of the $\alpha$-Al (darker area) and the $Al_2Cu$ (brighter area) phases (FIG. 8). During the dealloying process, the $\alpha$-Al phase dissolves first to create micropores. The $Al_2Cu$ phase dissolves later to create nanopores in each of the microscale $Al_2Cu$ struts, as schematically shown in FIG. 10.

Lithium-Ion Battery Cycling Performance of the Hierarchical Porous Copper as the Anode For potential use as an advanced lithium-ion battery anode, the hierarchical microporous or nanoporous copper sample (p15h) was applied as both the anode current collector and the porous substrate for tin coating. The integrated, hierarchical electrode structure with the well-developed porosity can be a rational design to alleviate the large volume change of tin during repeated charging or discharging processes.

Figure 11:
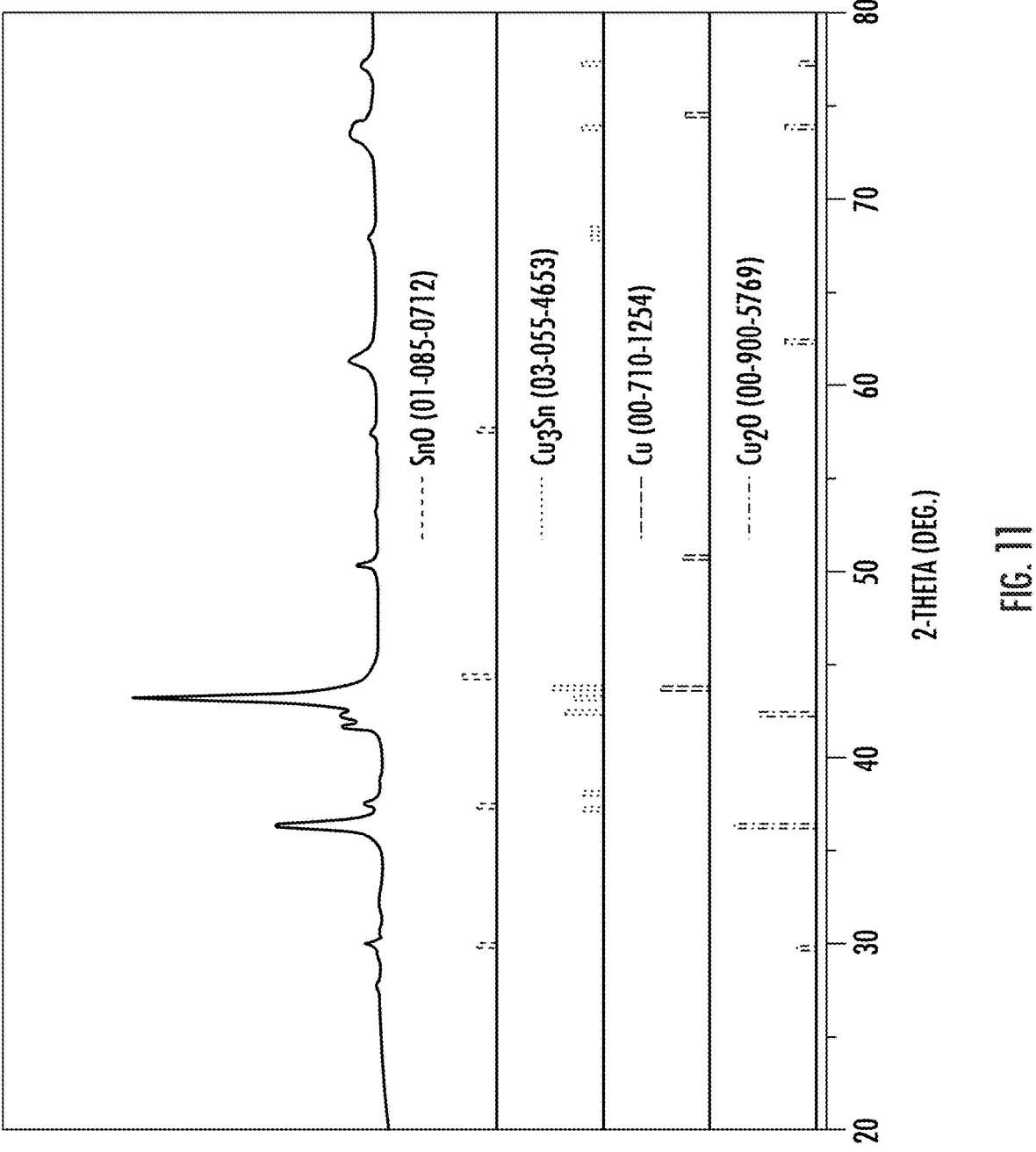
FIG. 11 shows x-ray diffraction patterns of the p15h microporous or nanoporous copper sample after tin coating using an electroless plating method with a heat treatment at about 150 degrees Celsius for about 1 hour.

FIG. 11 shows x-ray diffraction patterns of the tin-coated microporous or nanoporous copper with an additional heat-treatment at 150 degrees Celsius for 1 hour. The tin-coated copper foam anode after heat treatment reveals diffraction peaks of the $SnO/Cu_3Sn/Cu_2O/Cu$ phases. The $Cu_2O$ phase generally forms at temperatures between 70 degrees Celsius and 130 degrees Celsius. Additionally, the intermetallic compound phase of $Cu_3Sn$ is known as being inactive to the reaction with lithium ions and the uniform presence of such inactive material (as in a composite material) can favorably buffer the volume change during charge or discharging processes.

Figure 4A:
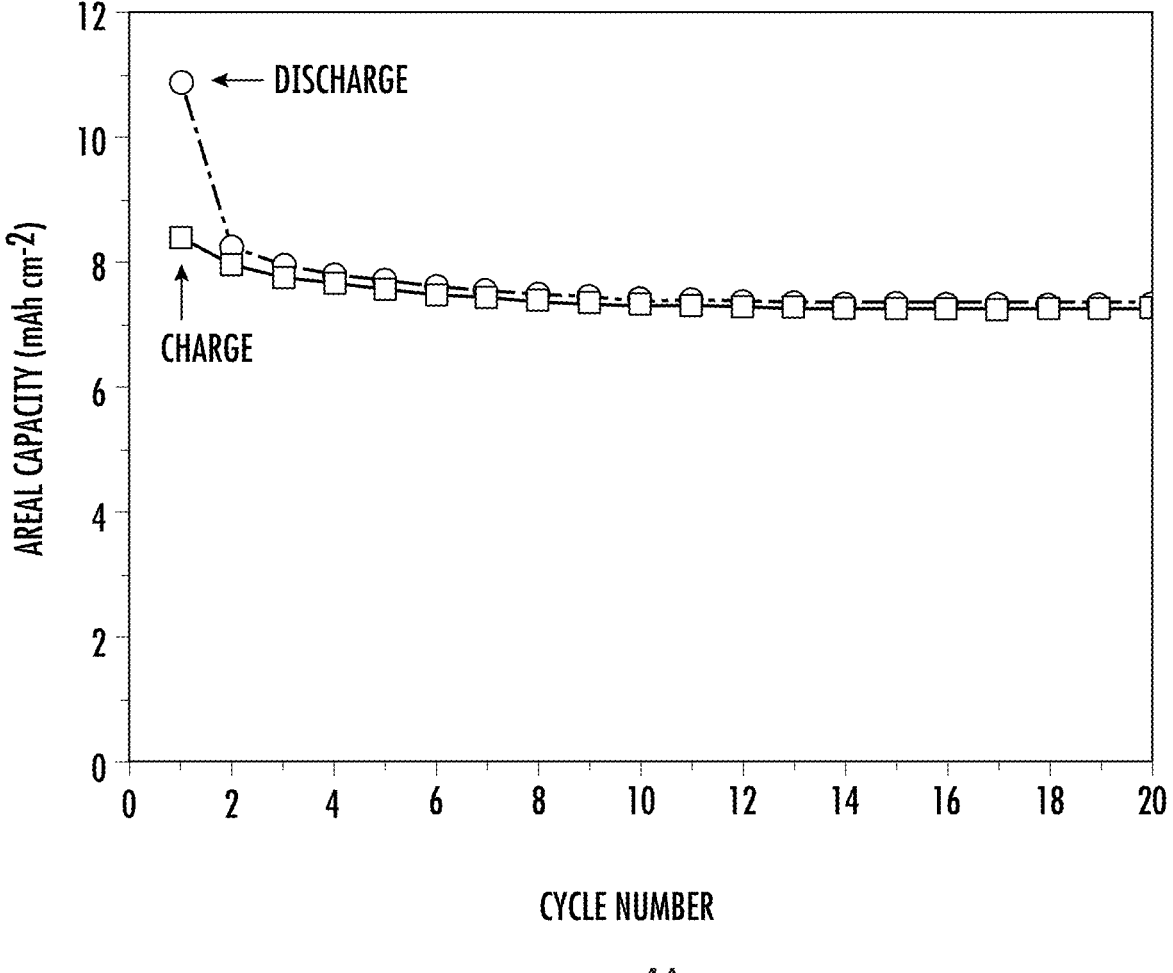

FIG. 4A shows the cyclic performance of the tin-coated microporous or nanoporous copper anode at 1 milliamps per square centimeter in range from 0.01-3 volts. The first discharge capacity of this sample is up to 10.9 milliamp-hours per square centimeter. The second and third discharge capacities are 8.3 and 8.0 milliamp-hours per square centimeter, respectively. The slightly degraded capacity of the initial cycles is due to the irreversible reactions associated with the SnO and $Cu_2O$ oxide active material. Additionally, the discharge capacity was stabilized to be 7.4 milliamp-hours per square centimeter on the twentieth cycle without any performance degradation being observed. In contrast, previous reports revealed severe capacity degradation and the premature failure of the tin-based anode during initial cycling.

FIG. 4B shows the performance comparison between the tin-coated microporous or nanoporous copper anode and similar nanoscale anode materials such as nanoparticles, nanosheets, and nanowires that have been developed in recent years. The tin-coated microporous or nanoporous copper anode (manufactured using a new copper foil-based pack cementation process in this approach) shows superior areal capacity performance compared with other similar nanostructured anode materials under similar current density conditions. For example, it shows approximately four-fold higher areal capacity than the traditional graphite anode.

This patent shows that the tin-coated hierarchical microporous or nanoporous copper anode can achieve stable and improved capacity by effectively reducing the stress caused by the large volume expansion in tin active material during the charging/discharging processes. More specifically, the microporous or nanoporous copper or tin anode, which was integrated as both the current collector and the active anode material without the addition of binder and conductive agent, delivered the remarkable reversible capacity of 7.4 milliamp-hours per square centimeter after 20 cycles. The practical use of the hierarchical microporous or nanoporous copper is not limited to the lithium-ion battery anode application; however, it should also be applicable to other energy areas that can utilize its extremely large surface area and the unique pore structure.

Figure 5:
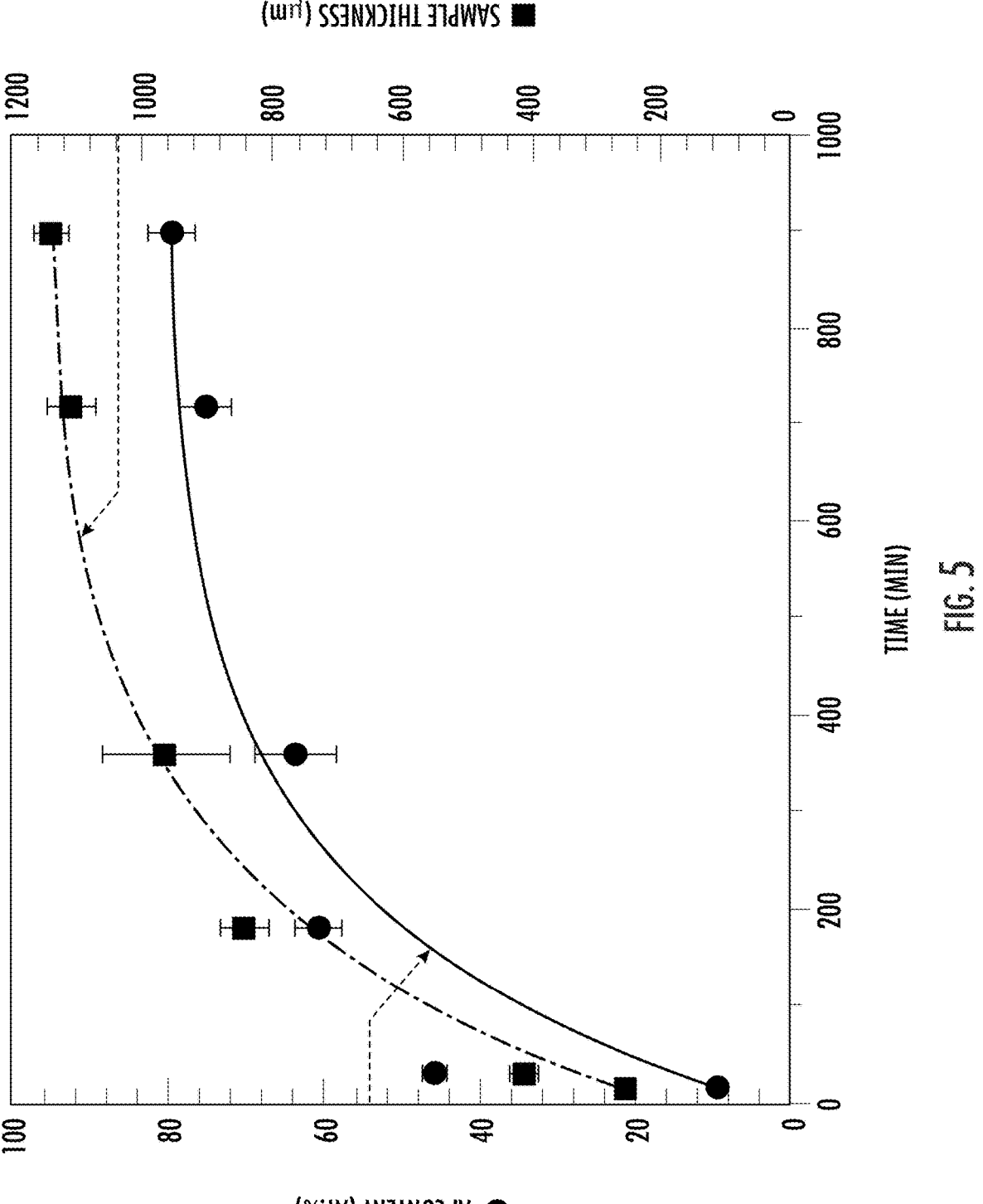
FIG. 5 shows plots of aluminum composition change and the coating thickness of the aluminum-copper alloy precursor foils with increasing time of the pack cementation process carried out at about 800 degrees Celsius.
Figures 6A, 6B, 6C, 6D, 6E, 6F:
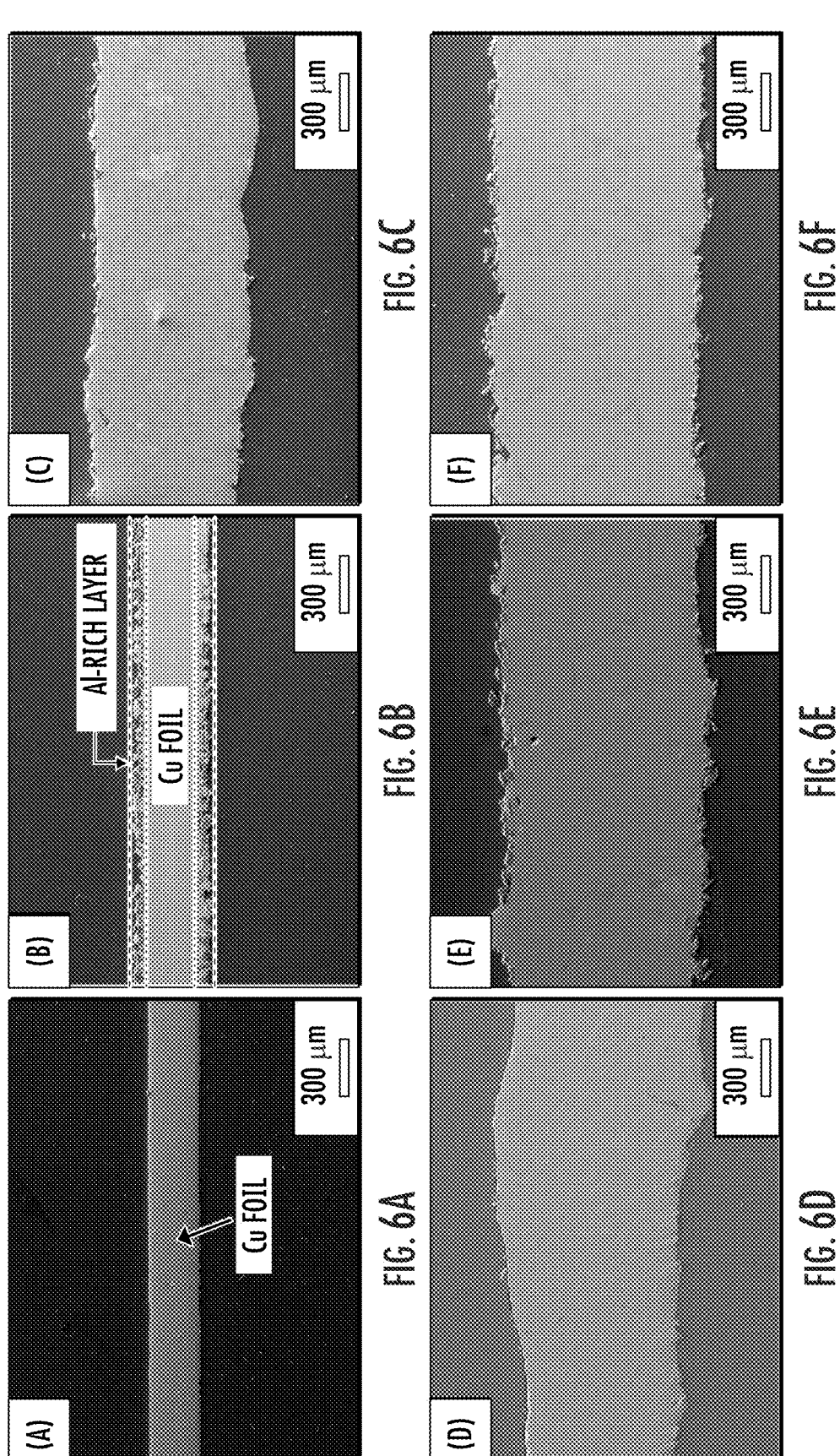
FIGS. 6A-6F show scanning electron microscopt (SEM) cross-sectional images of the copper foil samples during the pack-cementation aluminum coating process (a: p15m, b: p30m, c: p3h, d: p6h, e: p12h, and f: p15h), which compare the increased thickness of the copper foil specimens.
Figures 7A, 7B, 7C, 7D:
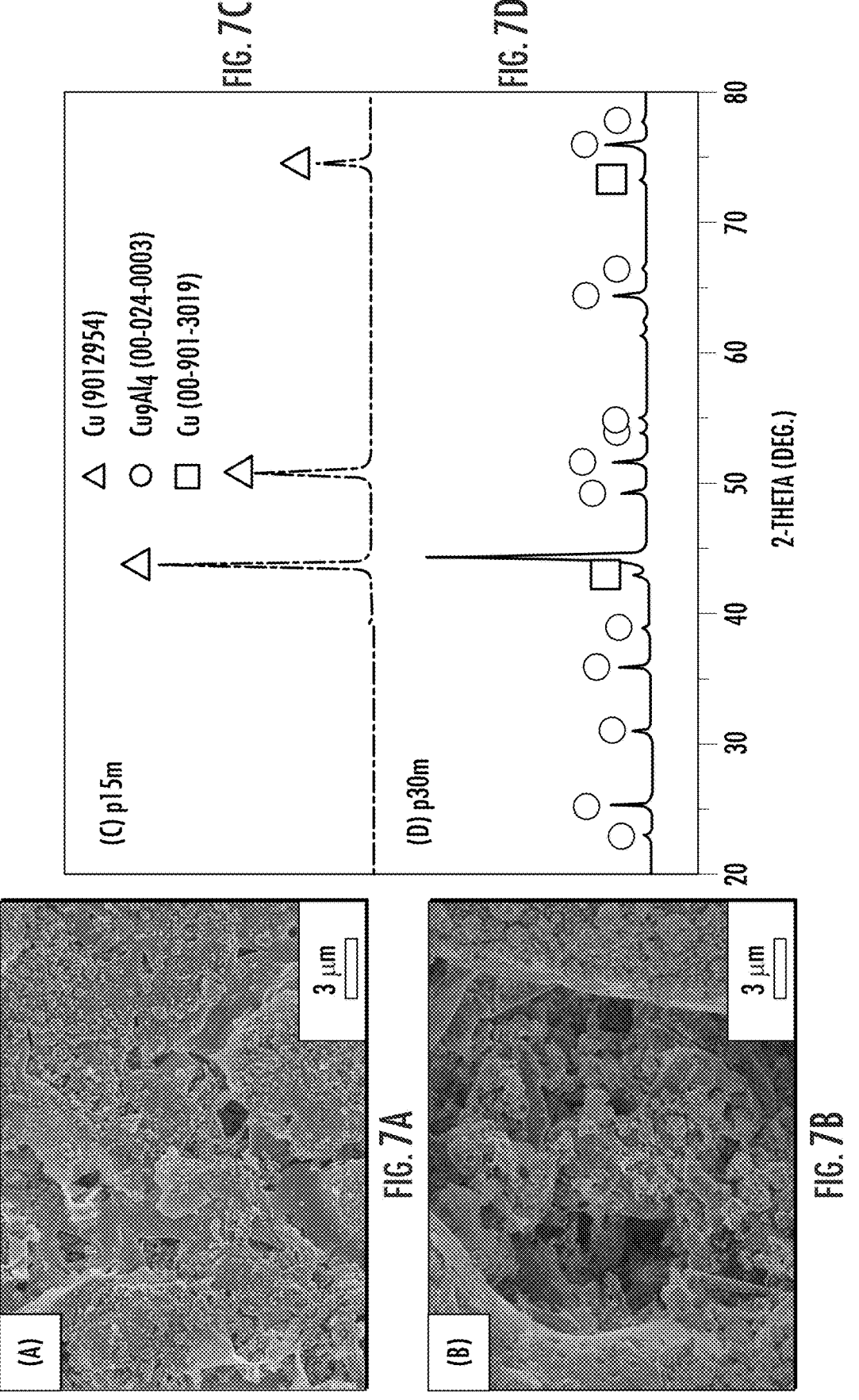
FIGS. 7A-7D show SEM images of the surface of the pack-cemented specimens (a: p15m and b: p30m) after dealloying and the corresponding x-ray diffraction patterns. The x-ray diffraction patterns of both the p15m and p30m samples indicate the presence of only the copper and $Cu_9Al_4$ phases.

FIG. 5 shows plots of aluminum composition change and the coating thickness of the aluminum-copper alloy precursor foils with increasing time of the pack cementation process carried out at 800 degrees Celsius.

FIGS. 6A-6F show SEM cross-sectional images of the copper foil samples during the pack-cementation aluminum coating process (a: p15m, b: p30m, c: p3h, d: p6h, e: p12h, and f: p15h), which compare the increased thickness of the copper foil specimens.

FIG. 7 shows SEM images of the surface of the pack-cemented specimens (a: p15m and b: p30m) after dealloying and the corresponding x-ray diffraction patterns. The x-ray diffraction patterns of both the p15m and p30m samples indicate the presence of only the copper and $Cu_9Al_4$ phases. Note that the presence of only the two phases cannot make dealloying complete through the entire interior of the sample due to its low aluminum content. However, only the outer surfaces of the samples were dealloyed which created some irregular surface pores (as shown in the SEM images).

FIG. 8 shows back-scattered SEM image of the p15h sample showing a continuous network of the solid-solution $\alpha$-Al (darker area: A) and $Al_2Cu$ (brighter area: B). Upon deploying, uniform three dimensionally connected $\alpha$-Al and $Al_2Cu$ phases created micropores and nanopores, respectively.

FIG. 9 shows a comparison plot of strut size distribution in the nanoporous and microporous or nanoporous copper samples using a standard metallographic method.

FIG. 10 shows schematic showing the dealloying mechanism of the hierarchical microporous or nanoporous copper sample manufactured as described. The solid-solution $\alpha$-Al phase creates micropores whereas the intermetallic $Al_2Cu$ phase creates nanopores upon dealloying.

FIG. 11 shows x-ray diffraction patterns of the p15h microporous or nanoporous copper sample after tin coating using an electroless plating method with a heat-treatment at 150 degrees Celsius for 1 hour.

CONCLUSION

A facile dealloying method was successfully developed in combination with a pack-cementation aluminum coating processing for a copper foil to prepare copper-aluminum alloy precursors with about 10-80 atomic percent aluminum. A pack-cementation time of 15 hours at 800 degrees Celsius resulted in a dual-phase of solid-solution $\alpha$-Al and an intermetallic $Al_2Cu$ phase, which could create a hierarchically structured microporous or nanoporous copper upon dealloying. In this case, the solid-solution $\alpha$-Al phase could be preferentially etched away in an acid solution leaving micropores behind. Subsequently, the Al$_2$Cu phase could create nanopores in the Al$_2$Cu microscale struts.

To demonstrate the promising energy applications of the microporous or nanoporous copper, it was applied as an advanced anode of lithium-ion battery after coating it with metallic tin as an anode active material (through an electro-less plating process). This resulted in a combination of SnO/Cu$_3$Sn/Cu$_2$O/Cu phases. In addition, the tin-coated hierarchical microporous or nanoporous copper anode exhibited a four-fold higher capacity as compared to tradi-tional graphite. This was achieved with successful adoption of tin active material coating by effectively reducing the stress caused by the large volume expansion during the charging or discharging processes.

This description of the invention has been presented for the purposes of illustration and description. It is not intended to be exhaustive or to limit the invention to the precise form described, and many modifications and variations are pos-sible in light of the teaching above. The embodiments were chosen and described in order to best explain the principles of the invention and its practical applications. This descrip-tion will enable others skilled in the art to best utilize and practice the invention in various embodiments and with various modifications as are suited to a particular use. The scope of the invention is defined by the following claims.

The invention claimed is:

1. A method comprising:
using pack cementation to manufacture a precursor alloy of aluminum and copper, wherein the pack cementation comprises an in-situ chemical vapor deposition of a coating of the aluminum on the copper, and the pre-cursor alloy is in the form of a foil;
dealloying the precursor alloy, wherein the aluminum is removed during the dealloying, thereby forming nanoscale copper struts and pores throughout a speci-men of hierarchical microporous or nanoporous copper or full nanoporous copper; and
obtaining the specimen.

2. The method of claim 1 wherein the foil of the precursor alloy comprises an aluminum-copper alloy, the aluminum has a concentration from 20 atomic percent to 85 atomic percent, and the method comprises
processing the precursor alloy in a dealloying solution of hydrochloric acid, wherein a ligament size is modified from 50 nanometers to 500 nanometers,
controlling a pore size to be from 10 nanometers to 10 microns, which results from different corrosion behav-ior for the different aluminum-copper phases.

3. The method of claim 2 comprising:
when forming the precursor alloy, selecting or varying a pack cementation temperature from 400 degrees Cel-sius to 900 degrees Celsius.

4. The method of claim 2 where the dealloying solution is a 0.01 molar to 20 molar hydrochloric acid solution and at 20 degrees Celsius to 100 degrees Celsius.

5. The method of claim 1 wherein the pack cementation process comprises using a mixed powder pack of one or more metal powders, a filler, and a halide salt activator.

6. The method of claim 5 wherein the halide salt activator is a material selected from a group consisting of sodium chloride (NaCl), sodium fluoride (NaF), and ammonium chloride (NH$_4$Cl).

7. The method of claim 6 wherein the pack cementation temperature is set below the melting temperature of metal precursor.

8. The method of claim 1 wherein the dealloying is in a dealloying solution that is selected from a group consisting of hydrogen chloride (HCl), sodium hydroxide (NaOH), nitric acid (HNO$_3$), phosphoric acid (H$_3$PO$_4$), and perchloric acid (HClO$_4$).

9. The method of claim 1 comprising:
using the specimen to form a lithium-ion battery anode current collector, wherein the specimen is coated with tin active material, whereby the coated porous copper reacts with and stores lithium ions and well accommo-dates the volume expansion during charging and dis-charging cycling processes.

10. The method of claim 1 comprising:
forming an anode current collector of a lithium-ion bat-tery from the specimen, wherein the specimen is coated with tin active material; and
filling a nanocopper foam anode of the lithium-ion battery with an additional anode active material, wherein the additional anode active material comprises at least one of a graphite-based material, metal-based material, or oxide-based material.

11. The method of claim 10 wherein the additional anode active material is selected from a group consisting of arti-ficial graphite, natural graphite, soft carbon, hard carbon, tin-lithium based alloys, silicon-lithium based alloys, indium-lithium based alloys, antimony-lithium based alloys, germanium-lithium based alloys, bismuth-lithium based alloys, gallium-lithium based alloys, and oxide based mate-rials, wherein the oxide based materials are selected from a group consisting of tin dioxide, cobalt oxide, copper oxide, nickel oxide, and iron oxide, or mixtures thereof.

12. The method of claim 1 wherein the pack cementation is performed at a temperature of 800 degrees Celsius.

13. The method of claim 1 comprising:
after pack cementation, homogenizing the precursor alloy by heat treatment.

14. The method of claim 1 comprising:
after pack cementation, homogenizing the precursor alloy by heat treatment in an argon atmosphere.

15. The method of claim 1 comprising:
after pack cementation, homogenizing the precursor alloy by heat treatment at a temperature of at least one of 500 degrees Celsius or 700 degrees Celsius.

16. A method comprising:
manufacturing a precursor alloy using pack cementation at a temperature from 400 degrees Celsius to 900 degrees Celsius,
wherein the precursor alloy is in the form of a foil, and the foil of the precursor alloy comprises an aluminum-copper alloy, and the aluminum possesses greater cor-rosiveness than copper;
dealloying the precursor alloy in a dealloying solution, wherein the dealloying solution is a 0.01 molar to 20 molar hydrochloric acid solution and at 20 degrees Celsius to 100 degrees Celsius, thereby forming nanoscale copper struts and pores throughout a speci-men of hierarchical microporous or nanoporous copper or full nanoporous copper; and
obtaining the specimen comprising a pore size from 10 nanometers to 10 microns.

17. The method of claim 16 wherein the pack cementation process comprises using a halide salt activator comprising sodium fluoride (NaF).

18. The method of claim 17 wherein the pack cementation temperature is set below the melting temperature of metal precursor.

19. The method of claim 16 wherein the pack cementation process comprises using a halide salt activator comprising ammonium chloride (NH$_4$Cl).

20. The method of claim 16 wherein the metal is aluminum comprising a concentration from 20 atomic percent to 85 atomic percent.

21. A method comprising:

mixing aluminum and copper powders to obtain an aluminum-copper mixture;

packing and sealing the aluminum-copper mixture in an envelope;

forming a precursor alloy of aluminum and copper by pack cementation of the aluminum-copper mixture in an envelope;

homogenizing the precursor alloy by heat treatment;

dealloying the precursor alloy, wherein the aluminum metal of the precursor alloy is removed during the dealloying, thereby forming nanoscale copper struts and pores throughout a specimen of hierarchical microporous or nanoporous copper or full nanoporous copper to obtain a nanoporous copper specimen.

22. The method of claim 21 wherein the homogenization of the precursor alloy by heat treatment is at a temperature of at least one of 500 degrees Celsius or 700 degrees Celsius.

23. The method of claim 21 wherein the homogenization of the precursor alloy by heat treatment is in an argon atmosphere.

24. The method of claim 21 wherein the pack cementation is performed at a temperature of 800 degrees Celsius.

25. The method of claim 21 wherein the dealloying of the precursor alloy comprises etching the precursor alloy in a hydrochloric acid solution.

26. The method of claim 21 wherein a time of pack cementation varies from 15 minutes to 15 hours.

27. The method of claim 21 wherein a time of pack cementation of 30 minutes yields a precursor alloy of about 45.9 atomic percent aluminum and about 54.2 atomic percent copper.

28. The method of claim 21 wherein a time of pack cementation of 15 hours minutes yields a precursor alloy of about 79.6 atomic percent aluminum and about 20.4 atomic percent copper.

* * * * *